United States Patent
Blakeney (10) Patent No.: US 9,117,222 B2
(45) Date of Patent: Aug. 25, 2015

(54) LOTTERY VENDING MACHINE

(76) Inventor: Lisa-Marie Blakeney, Weymouth, MA (US)

( * ) Notice: Subject to any disclaimer, the term of this patent is extended or adjusted under 35 U.S.C. 154(b) by 197 days.

(21) Appl. No.: 13/597,191

(22) Filed: Aug. 28, 2012

(65) Prior Publication Data

US 2013/0204683 A1 Aug. 8, 2013

Related U.S. Application Data

(60) Provisional application No. 61/594,332, filed on Feb. 2, 2012.

(51) Int. Cl.
*G06Q 30/02* (2012.01)
*G07F 17/32* (2006.01)
*G07F 17/42* (2006.01)
*G06Q 50/34* (2012.01)

(52) U.S. Cl.
CPC .............. *G06Q 30/02* (2013.01); *G06Q 50/34* (2013.01); *G07F 17/329* (2013.01); *G07F 17/3246* (2013.01); *G07F 17/42* (2013.01)

(58) Field of Classification Search
CPC . G07F 17/32; G07F 17/3244; G07F 17/3262; G07F 17/3248; G07F 17/3216; G07F 17/3223; G07F 17/3255; G07F 17/3283; G07F 17/3297; G06N 3/006

USPC .............. 463/42, 25, 29, 16, 17; 705/14.14; 706/47; 436/15

See application file for complete search history.

(56) References Cited

U.S. PATENT DOCUMENTS

| | | | |
|---|---|---|---|
| 8,419,526 B1 * | 4/2013 | Cannon et al. | 463/25 |
| 2008/0318671 A1 * | 12/2008 | Rowe et al. | 463/26 |
| 2009/0093309 A9 * | 4/2009 | Patel et al. | 463/42 |
| 2009/0117997 A1 | 5/2009 | Oram et al. | |
| 2009/0137304 A1 * | 5/2009 | Yacenda | 463/17 |
| 2009/0149245 A1 | 6/2009 | Fabbri | |
| 2010/0160022 A1 * | 6/2010 | Oram | 463/17 |
| 2011/0086693 A1 | 4/2011 | Guziel et al. | |
| 2012/0122555 A1 * | 5/2012 | Schneider et al. | 463/25 |

* cited by examiner

*Primary Examiner* — Sonji Johnson (57) ABSTRACT

In one embodiment of the invention, an apparatus comprises a lottery vending machine having an input slot configured to receive a lottery ticket, a second input slot configured to receive cash, and an output slot configured to output at least one of a money amount and a lottery ticket. In an embodiment, the apparatus provides a selectable credit option where the lottery vending machine, in response to receiving a winning lottery ticket, is configured to provide one of the following credit options: a money prize, one or more selected lottery tickets, or a combination of one or more lottery ticket(s) and a money amount.

12 Claims, 4 Drawing Sheets

LOTTERY VENDING MACHINE

CROSS-REFERENCE TO RELATED APPLICATION

This application claims a priority to and claims the benefit of U.S. Provisional Application No. 61/594,332, filed on Feb. 2, 2012. U.S. Provisional Application No. 61/594,332 is hereby incorporated herein by reference.

TECHNICAL FIELD

Embodiments of the invention relate generally to lottery vending machines.

BACKGROUND

Self-service lottery ticket machines are mostly available at larger outlets such as, for example, grocery stores and selected retailers. These machines allow individuals to purchase lottery tickets, to select a lottery game, and/or to scan the tickets to determine if the tickets are winning tickets. These machines will typically accept bills such as, for example, $1, $5, and/or $20 bills.

Figure 1:
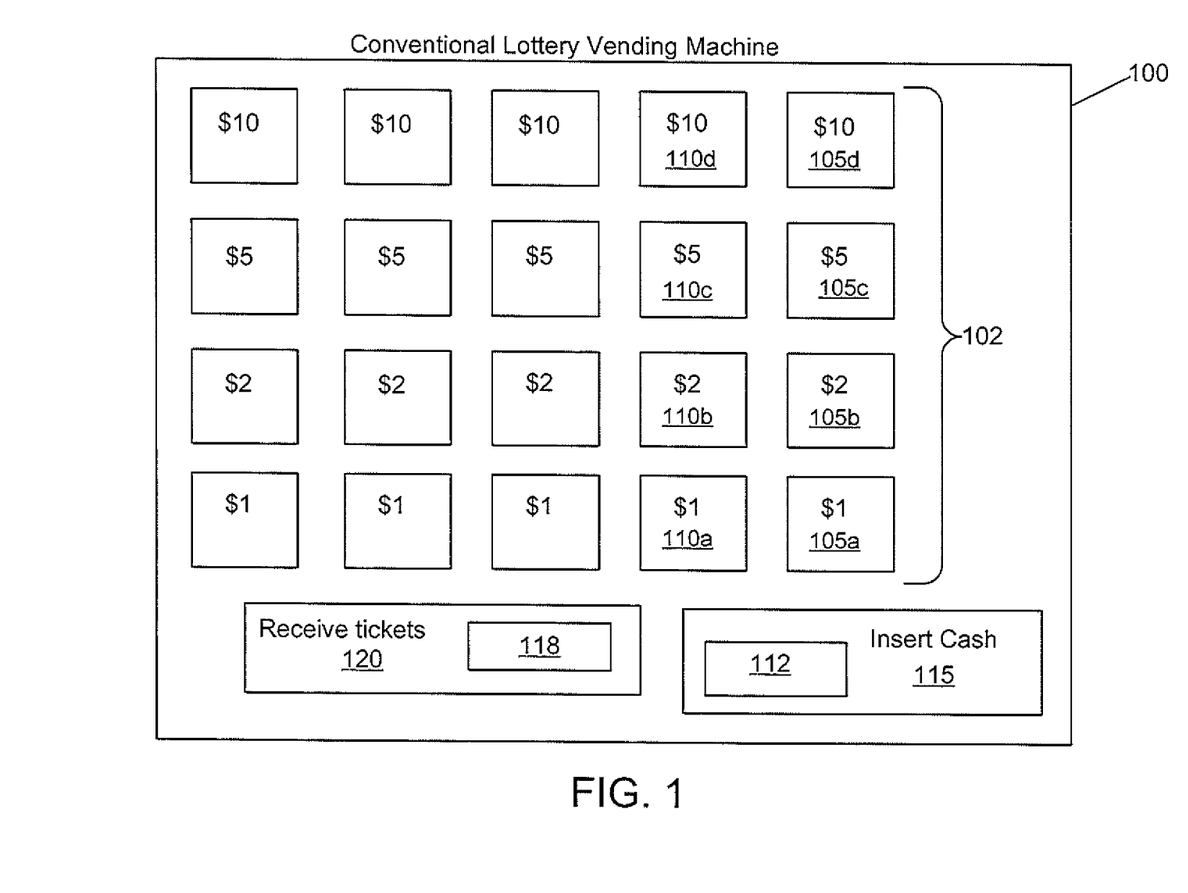
FIG. 1 is a block diagram of a conventional lottery vending machine.

FIG. 1 is a block diagram of a conventional lottery vending machine 100 that is currently available to individuals. The buttons set 102 permits the individual to select the lottery ticket payment price amount and/or lottery ticket type that the individual desires. For example, the buttons 105a, 105b, 105c, and 105d permit the individual to select lottery payment price amounts of $1, $2, $5, and $10, respectively, for a particular type of lottery contest. As another example, the buttons 110a, 110b, 110c, and 110d permit the individual to select the lottery payment price amounts of $1, $2, $5, and $10, respectively, for another particular type of lottery contest. The individual can insert cash 112 (e.g., dollar bills or coins) into the cash slot 115 and can receive the lottery ticket 118 desired by the individual from the ticket output slot 120.

However, these currently used self-service lottery ticket machines do not dispense funds for a winning ticket and require the winning ticket owner to seek a store clerk in order to obtain the winning ticket funds. This process is inconvenient for the ticket owner because he/she will need to find/seek a cashier and/or to wait for his/her turn at the cashier line.

In some states such as Ohio, for example, at least some lottery ticket machines permit the winning ticket holder to take credit from the machines. However, the credit amount provided by these lottery machines is limited to relatively small cash amounts. For example, these machines will not credit more than, for example, $60 dollars for a winning ticket.

Other current systems provide the following features. U.S. Pat. No. 7,914,371 discloses a networked-connected lottery machine that communicates with a server that is managed by a lottery authority. However, this lottery machine also requires the winning ticket owner to find/seek a cashier in order to claim the prize for a winning lottery ticket.

U.S. Patent Publication 2004/0087360 discloses networked gaming device that also communicates with a server. However, this gaming device does not provide some of the features in a self-service lottery ticket machine.

Based on the above discussion, the current technology is limited in its capabilities and suffers from at least the above constraints and deficiencies.

SUMMARY

In one embodiment of the invention, an apparatus includes a lottery vending machine having an input slot configured to receive a lottery ticket, a second input slot configured to receive cash, and an output slot configured to output at least one of a money prize and a purchased lottery ticket.

An embodiment of the invention provides an apparatus having a selectable credit option where the lottery vending machine, in response to receiving a winning lottery ticket, is configured to provide one of the following credit options: a money prize, one or more selected lottery tickets, or a combination of one or more lottery ticket(s) and a money amount.

In another embodiment of the invention, an apparatus includes a lottery vending machine having an input slot configured to receive a lottery ticket, a second input slot configured to receive cash, and means for outputting at least one of a money prize and a purchased lottery ticket.

In yet another embodiment of the invention, a method of processing a transaction in a lottery vending machine includes: inserting a lottery ticket into a lottery vending machine, scanning the lottery ticket, if the ticket is a winning ticket, then determining if the money prize exceeds a state limit, and if the money prize does not exceed the state limit, then providing a credit option from one of the following: a money prize, one or more lottery tickets, and a money prize and one or more lottery tickets.

In yet another embodiment of the invention, the lottery vending machine (and method performed by the machine) may be configured to eject (or return) the lottery ticket from the lottery vending machine back to the user, if the winning ticket exceeds the state limit.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

Additionally, the left-most digit of a reference number identifies the drawing in which the reference number first appears.

DETAILED DESCRIPTION OF PREFERRED EMBODIMENTS

In the description herein, numerous specific details are provided, such as examples of components, parts, structures, and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, structures, and/or the like. In other instances, well-known structures, materials, or operations are not shown or described in detail to avoid obscuring aspects of embodiments of the invention. Additionally, the figures are representative in nature and their shapes are not intended to illustrate the precise shape or precise size of any element and are not intended to limit the scope of the invention.

Those skilled in the art will understand that when an element or part in the drawings is referred to as being "on" (or "connected" to or "coupled" to or "attached" to) another element, it can be directly on (or attached to) the other element or intervening elements may also be present. Furthermore, relative terms such as "inner", "outer", "upper", "above", "lower", "beneath", and "below", and similar terms, may be used herein to describe a relationship of one element to another element. It is understood that these terms are intended to encompass different orientations of the device in addition to the orientation depicted in the figures.

Although the terms first, second, and the like may be used herein to describe various elements, components, parts, regions, layers, chambers, and/or sections, these elements, components, parts, regions, layers, chambers, slot, and/or sections should not be limited by these terms. These terms are only used to distinguish one element, component, part, region, layer, chamber, slot, or section from another element, component, part, region, layer, chamber, slot, or section. Thus, a first element, component, part, region, layer, chamber, slot, or section discussed below could be termed a second element, component, part, region, layer, chamber, slot, or section without departing from the teachings of the present invention.

Embodiments of the invention are described herein with reference to cross-sectional view illustrations that are schematic illustrations of representative embodiments of the invention. As such, variations from the shapes of the illustrations as a result of, for example, manufacturing techniques and/or tolerances are expected. For purposes of avoiding in overcrowding the drawings, the elements shown in the drawings are not necessarily drawn to scale, and the elements may be larger in physical size or smaller in physical size than as shown in the drawings.

Embodiments of the invention should not be construed as limited to the particular shapes of the regions or components/parts/elements illustrated herein but are to include deviations in shapes that result, for example, from manufacturing or particular implementations. For example, an element illustrated or described as square or rectangular may typically have rounded or curved features due to normal manufacturing tolerances or due to a particular implementation. Thus, the elements illustrated in the figures are schematic in nature and their shapes are not intended to illustrate the precise shape of an element of a device and are not intended to limit the scope of the invention.

Figure 2:
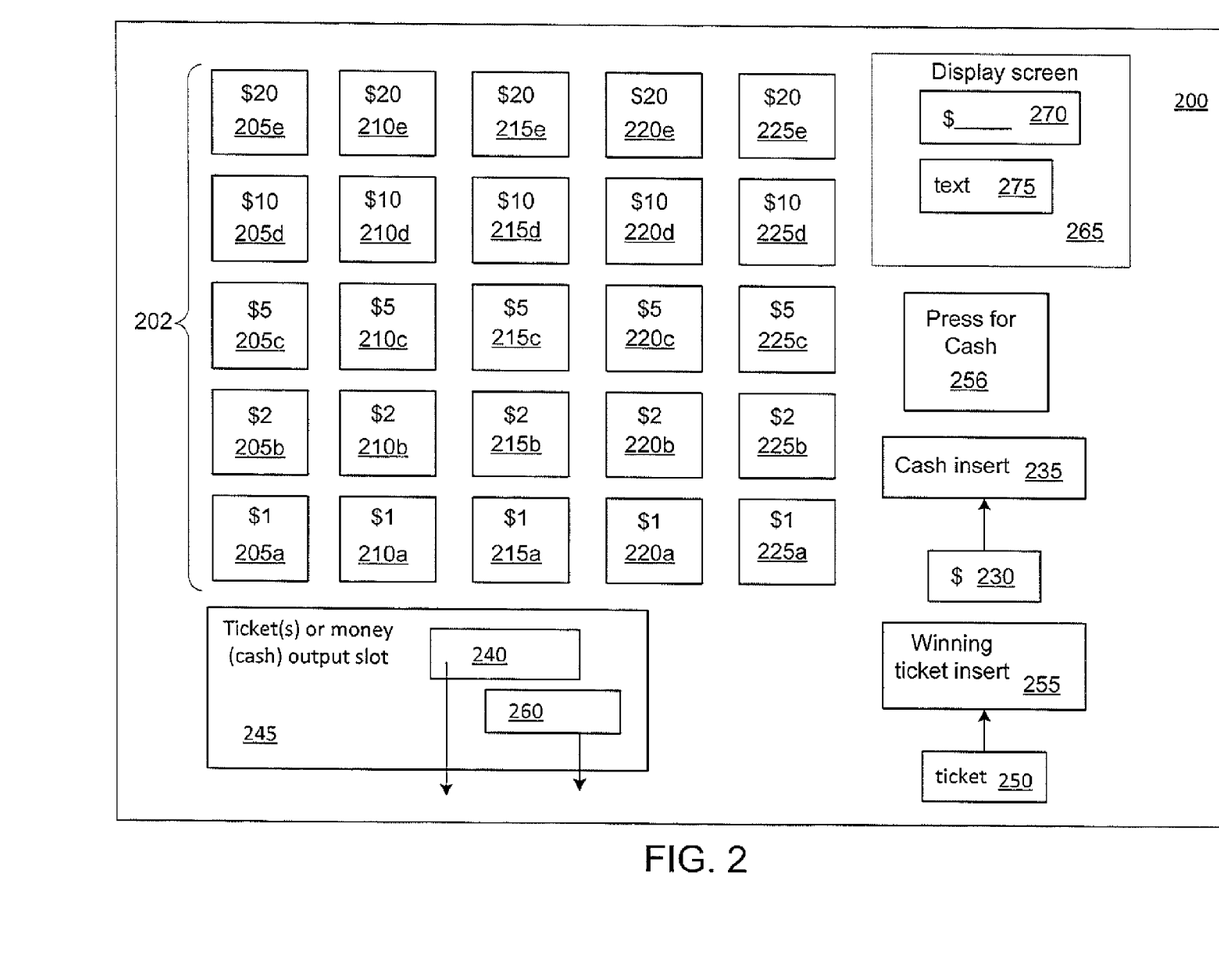
FIG. 2 is a block diagram of a lottery vending machine, in accordance with an embodiment of the invention.

FIG. 2 is a block diagram of a lottery vending machine 200, in accordance with an embodiment of the invention. The machine 200 includes the buttons set 202 that permits an individual to select the lottery ticket payment price amount and/or lottery ticket contest-type that the individual desires. For example, the buttons 205a, 205b, 205c, 205d, and 205e permit the individual to select lottery payment price amounts of $1, $2, $5, $10, and $20, respectively, for a particular type of lottery contest. As another example, the buttons 210a, 210b, 210c, 210d, and 210e permit the individual to select the lottery payment price amounts of $1, $2, $5, $10, and $20, respectively, for another particular type of lottery contest. It is understood the number of buttons and/or the number of button sub-sets among the set 202 may vary. For example, the set 202 may contain a greater number (or a lesser number) of buttons than those shown in FIG. 2. It is also understood that the payment amount corresponding to at least some of the buttons in the set 202 may also vary.

The buttons set 202 may further include additional buttons 215a-215e, 220a-220e, and/or 225a-225e for providing other types of lottery contests.

The individual can insert cash 230 (e.g., dollar bills or coins) into the cash slot (cash insert) 235 and can receive the lottery ticket 240 desired by the individual from the ticket output slot 245. The individual will receive a lottery ticket type based on the button selected among the buttons set 202.

The individual can also insert a winning lottery ticket 250 into the winning ticket slot 255 and then press the selector 256 (e.g., button 256) if the individual wishes to immediately receive the money prize 260 (e.g., cash prize 260) that is awarded for the winning lottery ticket 250. After inserting the winning lottery ticket 250 into the slot 255 and pressing the selector 256, the individual will receive the winning money prize 260 from the slot 245. The winning money prize 260 may be, by way of example and not by way of limitation, a cash amount.

In an embodiment of the invention, the machine 200 also includes a display screen 265 that is configured to display the money prize amount 270 for a winning lottery ticket 250 and/or is also configured to display a text message 275 that states "see lottery authority" if the money prize amount 270 is over the state limit for a money prize amount of a winning lottery ticket 250. The lottery vending machine 200 may be configured to eject (or return) the lottery ticket 250 from the machine 200 back to the user, if the winning ticket 250 exceeds the state limit. The machine 200 may be configured to eject the lottery ticket 250 from the ticket insert 255 or from the output slot 245.

In an embodiment, the display screen 265 is a light emitting diode (LED) screen that provides output lighting and displays the money prize amount 270 and text message 275.

Therefore, an embodiment of the invention provides a lottery vending machine 200 that makes the process of cashing in a winning lottery ticket 250 to be automated and easier and faster for the individual. The machine 200 allows for the ticket holder to cash in or dispose of a winning lottery ticket 250 without having to go to or find/seek a cashier(s), wait in line, and/or be subjected to other inconvenience when claiming a cash prize for a winning lottery ticket. The machine 200 will in essence eliminate the need for an individual to go to a convenience store and seek out a cashier to cash his/her winning lottery ticket(s).

As will be discussed in additional details below, in an embodiment of the invention, the lottery vending machine 200 would typically include other components such as, for example, a ticket feed mechanism for receiving and outputting a lottery ticket and a scanner which would read a code (e.g., a bar code) on the back of the lottery ticket to determine if the lottery ticket is a winning ticket.

Figure 3:
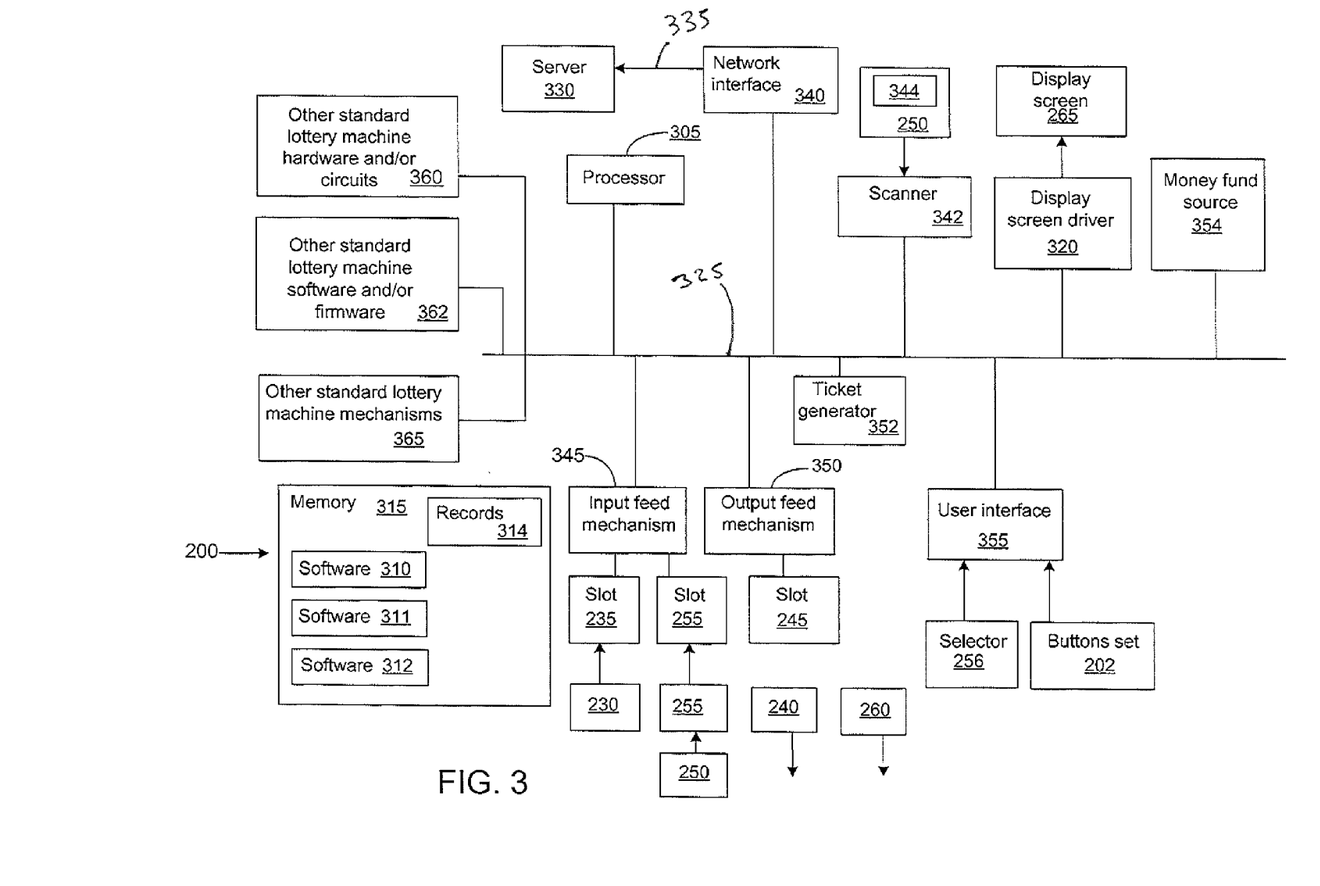
FIG. 3 is a block diagram of additional details of a lottery vending machine, in accordance with an embodiment of the invention.

FIG. 3 is a block diagram of additional details of a lottery vending machine 200, in accordance with an embodiment of the invention. The machine 200 includes a processor 305 which can be, for example, a microprocessor, microcontroller, another type of controller, or another suitable type of processing device. In another embodiment of the invention, the machine 200 may be adapted to be implemented by one or more application-specific integrated circuits (ASICs), one or more hard-wired devices, and/or one or more mechanical devices. The processor 305 executes one or more software (e.g. software 310 and/or firmware 310 and other software/firmware) in a memory device 315 so that various operations described below are performed. For example, the processor 305 permits the display screen driver 320 to display the winning money prize amount 270 and/or text message 275 in the display screen 265. The processor 305 executes the one or more software (and/or firmware) to perform other exemplary operations described below.

The one or more software code in the software 310 (and/or firmware 310) and in other software elements (and/or firmware elements) illustrated in FIG. 3 may be programmed by use of standard programming languages (e.g., C or C++) and by use of standard programming techniques known to those skilled in the relevant art(s). Computing elements that are known to those skilled in the relevant art(s) are not shown in the machine 200 of FIG. 3 for purposes of focusing the discussion on embodiments of the invention.

One or more communication busses 325 in the machine 200 permits communication among the components and/or devices in the machine 200.

The processor 305 also executes one or more software 310 (and/or firmware 310) which controls the machine 200 to play a particular lottery game in accordance with the applicable game rules and pay tables.

It is noted that although each machine 200 may include its own respective processor 305 and memory device 315, at least some or all of their functions may instead by provided at a remote location such as a network server (e.g., network server 330) that communicates with the machine 200 over a network 335 such as, for example, a local area network, a wide area network such as the Internet, a microwave network, a wireless network, and/or another suitable type of network. The machine 200 may include a network interface 340 that allows communication via the network 335 between the machine 200 and a node connected to the network 335.

The machine 200 also includes a scanner 342 that scans a code 344 (e.g., a bar code 344) on the lottery ticket 250, and the code 344 will contain the winning number if the ticket 344 is a winning lottery ticket. The scanner 342 reads the code 344 so that the processor 305 can determine whether or not the ticket 250 is a winning lottery ticket. This scanner 342 is similar in features and/or functions to a scanner that is used (by a cashier) for scanning the codes in a lottery ticket in order to determine if the lottery ticket contains a winning number set. The processor 305 can determine the values of the code 344 read by the scanner 342.

The machine 200 also includes an input feed mechanism 345 that receives and forwards (for processing by the machine 200) any cash 230 inserted into the slot 235 and lottery ticket 250 inserted into the slot 255.

The machine 200 also includes an output feed mechanism 350 that outputs any lottery ticket 240 generated by the lottery ticket generator 352 and as similarly discussed above. The lottery ticket generator 352 may be, for example, a standard lottery ticket generator that is used in current lottery vending machines. The output feed mechanism 350 also outputs any money prize 260 provided by a winning lottery ticket 250. The money prize 260 is obtained from the money fund source 354 and was similarly discussed above.

The machine 200 also includes a user interface block 355 that receives any inputs through the selector 256 and the buttons set 202 as have been discussed above.

The machine 200 also includes standard lottery vending machine components that are known to those skilled in the relevant art(s) and are as follows: (1) other standard lottery machine hardware and/or circuits as represented by the block 360, (2) other standard lottery machine software and/or firmware as represented by the block 362, and (3) other standard lottery machine mechanisms as represented by the block 365.

For purposes of focusing on the features in the embodiments of the invention, the details of blocks 360, 362, and 365 are not discussed herein.

Another exemplary operation of the machine 200 is now discussed. If a lottery ticket 250 is not a winning lottery ticket, the scanner 342 reads the code 344 and the processor 305 determines that the code 344 does not contain a winning number set as set by a software 310. Since the lottery ticket 250 does not contain a code 344 that is a winner, the processor 305 permits the display screen driver 320 to display "$0" in the money prize display 270 and the slot 245 will not provide any money 260.

On the other hand, if the scanner 342 reads the code 344 and the processor 305 determines that the code 344 contains a winning number set as set by a software 310, then the processor 305 permits the display screen driver 320 to display the winning money prize dollar amount in the money prize display 270 of the screen 265 and the machine 200 does not provide any money prize 260 if the winning money prize dollar amount exceeds a state limit. If the winning money prize dollar amount exceeds the state limit, the processor 305 permits the display screen driver 320 to display the winning money prize dollar amount in the money prize display 270 of screen 265 and to display a text message in the text display 275 of the screen 265. For example, the text message might state the message: "State Limit exceeded, see lottery headquarters". The text message may also display the address of the lottery headquarters, or the address may be visibly fixed or listed on the machine 200 surface. The processor 305 (based on the programming of the software 310 stored in the memory 315) may be configured to trigger the output feed mechanism 350 to eject (or return) the lottery ticket 250 from the machine 200 back to the user, if the winning ticket 250 exceeds the state limit.

In an embodiment of the invention, if the winning money prize dollar amount of a lottery ticket 250 does not exceed the state limit, the machine 200 allows the individual with a winning lottery ticket 250 with any of the following credit options: (1) the individual can select to receive a money prize amount 260 associated with the winning lottery ticket 250, (2) the individual can select to purchase and receive additional lottery tickets in the total amount equal to the money prize amount 260 associated with the winning lottery ticket 250, or (3) the individual can select to receive a combination of both money prize and additionally purchased lottery tickets where the money prize and additionally purchased lottery tickets will have a sum equal to the money prize amount 260 associated with the winning lottery ticket 250. For example, if the money prize for a winning lottery ticket 250 is $10, then the individual can select any of the following credit options: (1) the user can select the selector 256, and in response to the signals from the actuation of the selector 256, the processor 350 will cause the output feed mechanism 350 to obtain $10 from the source 354 and to provide the $10 through the slot 245; (2) the user can select one or more buttons in the set 202 that have cash values equal to the money prize amount 260 of $10 (e.g., the user can select the button 205*d* which allows the user to purchase a $10 lottery ticket, or the user can select the buttons 205*c* and 210*c* which allow the user to purchase two $5 lottery tickets of two different types of lottery contests, or another combination of lottery tickets that total $10 in value), and in response to the signals from the actuations of the selected buttons in the set 202, the processor 305 will cause the output feed mechanism 350 to output the selected lottery ticket(s) generated by the lottery ticket generator 352; or (3) the user can select an appropriate button in the set 202 (e.g., the user can select the button 205*c* which is $5 lottery ticket for a particular type of lottery contest) and then select the selector 256, and in response to the signals from the actuation of the button 205*c* and the actuation of the selector 256, the processor 350 will cause the output feed mechanism 350 to output a $5 lottery ticket generated by the ticket generator 352 through the slot 245 and to obtain $5 from the source 354 to also provide the money prize 240 of $5 through the slot 245. The above credit options and calculations associated with a credit option may be performed by code in a software 311 (or firmware 311) that is executable by the processor 305 and stored in the memory 315. Alternatively, the functionality of the code in software 311 may be performed by code in the software 310 and the software 311 is omitted in this embodiment of the invention. In contrasts, conventional lottery ticket machines do not provide these credit options that the user can select and choose for a winning lottery ticket 250.

In an embodiment of the invention, the processor 305 executes the software 312 (or firmware 312) to permit the machine 200 to record and track all transactions in the lottery vending machine 200 and/or to perform other record tracking functions. The record 314 of all transactions and/or other data may be stored in the memory 315. Alternatively, the functionality of the code in software 312 may be performed by code in the software 310 and the software 312 is omitted in this embodiment of the invention.

In an embodiment of the invention, any of the above functions permitted by the software 310, software 311, and/or software 312 may instead be performed by the processor 305. The processor 305 may be configured to perform any of the functions permitted by the software 310, software 311, and/or software 312 by use of standard configuration techniques known to those skilled in the relevant art(s).

Figure 4:
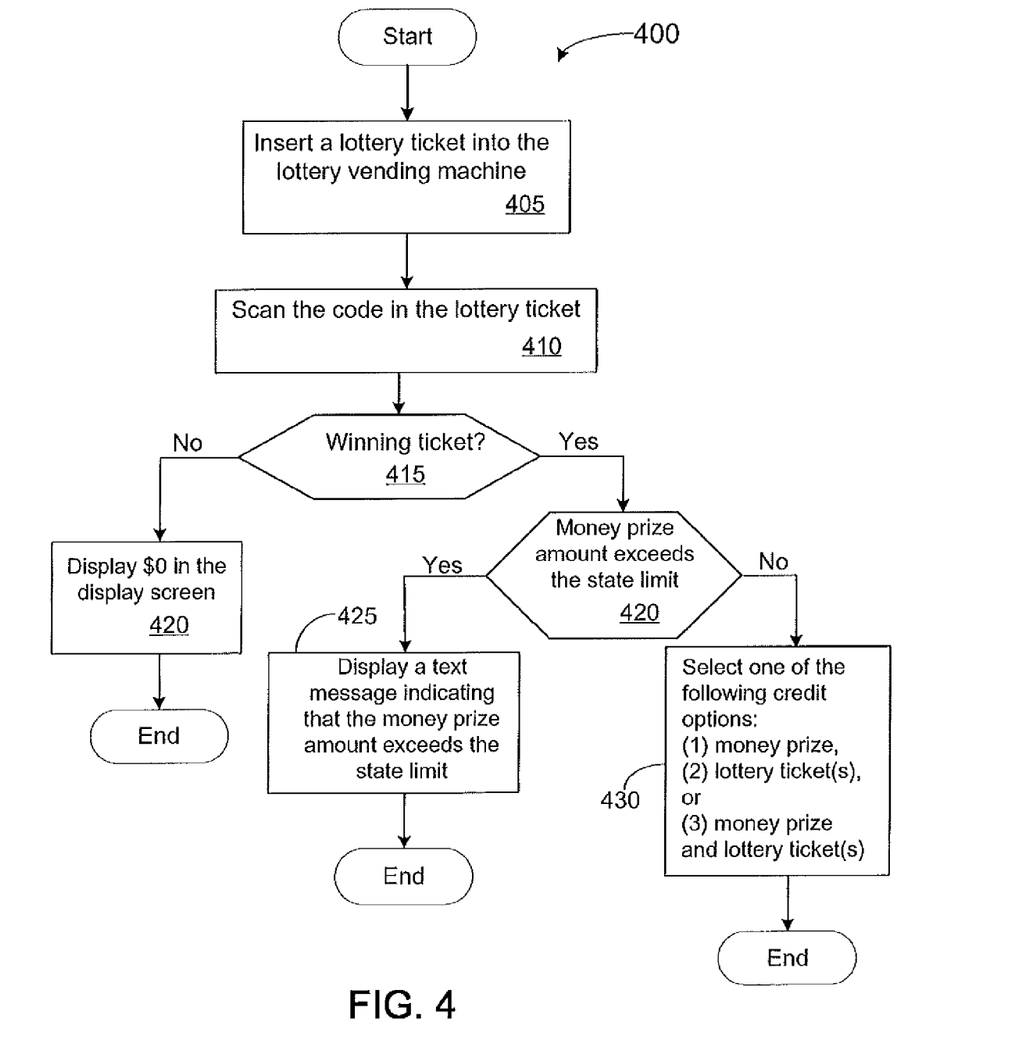
FIG. 4 is a method of processing a transaction in a lottery vending machine, in accordance with an embodiment of the invention.

FIG. 4 is a method 400 of processing a transaction in a lottery vending machine, in accordance with an embodiment of the invention. In block 405, the individual inserts a lottery ticket 250 into a lottery vending machine 200. In block 410, the scanner 342 in the machine 200 scans the code 344 in the lottery ticket 250 in order to determine if the ticket 250 contains a winning number set.

In block 415, the processor 305 determines whether or not the lottery ticket 250 contains a winning number set. If the lottery ticket 250 does not contain a winning number set, then in block 420, the display screen 265 will display $0 to indicate that the lottery ticket 250 is not a winning ticket and the machine 200 will not provide any money prizes 260 from the slot 245.

If the processor 305 determines that the lottery ticket 250 contains a winning number set, then in block 420, the processor 305 determines if the money prize amount of the winning lottery ticket exceeds the state limit. If the money prize amount exceeds the state limit, then in block 425, the display screen 265 will display a text message indicating that the money prize amounts exceeds the state limit and the machine 200 will not output any money prizes 260 through the slot 245. On the other hand, if the money prize amount does not exceed the state limit, then in block 430 the user can select one of the following credit options: (1) the user can select a money prize option and the machine 200 will output a money prize amount 260 (equal to the prize amount of the winning lottery ticket) through the slot 245; (2) the user can select a lottery ticket(s) only option and the machine 200 will output one or more selected lottery ticket(s) (having a sum value equal to the money prize amount of the winning lottery ticket) through the slot 245; and (3) the user can select a money prize and lottery ticket(s) combination option and the machine 200 will output a money prize amount and one or more selected lottery tickets through the slot 245, and the money prize amount and the selected lottery ticket(s) will have a sum value equal to the money prize amount of the winning lottery ticket.

Therefore, an embodiment of the invention provides at least one of the following features.

An embodiment of the invention provides an apparatus comprising a lottery vending machine having an input slot configured to receive a lottery ticket, a second input slot configured to receive cash, and an output slot configured to output at least one of a money prize and a purchased lottery ticket.

In an embodiment, the apparatus provides a selectable credit option where the lottery vending machine, in response to receiving a winning lottery ticket, is configured to provide one of the following credit options: a money prize, one or more selected lottery tickets, or a combination of one or more lottery ticket(s) and a money amount.

In an embodiment, the apparatus is configured to scan the lottery ticket in order to determine if the lottery ticket includes a winning number set.

In an embodiment, the apparatus is configured to display a money prize amount of a lottery ticket with a winning number set.

In an embodiment, the apparatus is configured to display a text message if a money prize amount of a lottery ticket with a winning number set exceeds a state limit.

In yet another embodiment of the invention, a method of processing a transaction in a lottery vending machine includes: inserting a lottery ticket into a lottery vending machine, scanning the lottery ticket, if the ticket is a winning ticket, then determining if the money prize exceeds a state limit, and if the money prize does not exceed the state limit, then providing a credit option from one of the following: a money prize, one or more lottery tickets, and a money prize and one or more lottery tickets.

Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
a lottery vending machine configured to receive a winning lottery ticket and configured to receive cash;
wherein the winning lottery ticket is directed to a particular type of lottery contest; wherein the lottery vending machine is configured to receive the winning lottery ticket in a ticket insert in the lottery vending machine;
wherein the lottery vending machine is configured to receive cash in a cash insert in the lottery vending machine and is configured to output a second lottery ticket on an output slot in the lottery vending machine based on the cash received in the cash insert and on a lottery contest selected in a user interface block on the lottery vending machine;

wherein the winning lottery ticket comprises a code;
wherein the lottery vending machine comprises a scanner configured for scanning the code and a processor configured for determining if the winning lottery ticket comprises a winning number set in the particular type of lottery contest;
wherein the lottery vending machine comprises a money fund source in the lottery vending machine, wherein the money fund source provides a money prize comprising cash that is outputted on the output slot in the lottery vending machine;
wherein the lottery vending machine comprises a screen configured for displaying a money prize amount associated with the winning lottery ticket;
wherein the user interface block is configured for receiving an input from an individual so that the input permits the individual to select the lottery vending machine to perform one of the following outputs from the output slot: the lottery vending machine outputs cash having an amount equal to the money prize amount associated with the winning lottery ticket wherein the money fund source provides the cash, outputs another lottery ticket having a value equal to the money prize amount, outputs a first plurality of lottery tickets having a sum value equal to the money prize amount, outputs a second plurality of lottery tickets directed to different types of lottery contests and having the sum value equal to the money prize amount, or outputs a combination of cash and at least one additional lottery ticket wherein the combination has the sum value equal to the money prize amount;
wherein each one of the lottery tickets that is outputted by the lottery vending machine includes a respective code and is directed to a corresponding lottery contest;
wherein the screen displays a zero dollar amount and the output slot does not output any cash if the winning lottery ticket does not include the winning number set;
wherein the cash from the money fund source comprises at least one dollar bill; wherein the particular type of lottery contest and corresponding lottery contest are managed by a state lottery authority and wherein the lottery vending machine is configured to elect the winning lottery ticket and is configured to not output any prizes, if the money prize amount of the winning lottery ticket with the winning number set exceeds a state limit.

2. The apparatus of claim 1, wherein each one of the lottery tickets output by the lottery vending machine is output from the output slot.

3. The apparatus of claim 1, wherein the user interface block in the lottery vending machine includes a plurality of buttons that permit the individual to select at least one of a lottery payment price and a type of lottery contest.

4. The apparatus of claim 1, wherein the lottery vending machine is configured to display the money prize amount if the winning lottery ticket has the winning number set.

5. The apparatus of claim 1, wherein the lottery vending machine is configured to determine if a money prize amount of the winning lottery ticket with the winning number set exceeds a state limit.

6. The apparatus of claim 1, wherein the lottery vending machine is configured to display a text message and is configured to not output any prizes, if the money prize amount of the winning lottery ticket with the winning number set exceeds a state limit.

7. The apparatus of claim 1, further comprising: a software executed by the processor and configured to provide a credit option that is selected by the individual and configured to provide calculations based on the money prize amount of the winning lottery ticket with the winning number set.

8. An apparatus, comprising:
a lottery vending machine including:
a ticket insert configured for receiving a winning lottery ticket;
a cash insert configured for receiving cash;
wherein the winning lottery ticket is directed to a particular type of lottery contest; wherein the lottery vending machine is configured to receive the winning lottery ticket in the ticket insert configured for receiving the winning lottery ticket in the lottery vending machine;
wherein the lottery vending machine is configured to receive cash in the cash insert and is configured to output a second lottery ticket on an output slot in the lottery vending machine based on the cash received in the cash insert and on a lottery contest selected in a user interface block on the lottery vending machine;
and wherein the winning lottery ticket comprises a code;
wherein the lottery vending machine comprises a scanner configured for scanning the code and a processor configured for determining if the winning lottery ticket comprises a winning number set in the particular type of lottery contest;
wherein the lottery vending machine comprises a money fund source in the lottery vending machine, wherein the money fund source provides a money prize comprising cash that is outputted on the output slot in the lottery vending machine;
wherein the lottery vending machine comprises a screen configured for displaying a money prize amount associated with the winning lottery ticket;
wherein the user interface block is configured for receiving an input from an individual so that the input permits the individual to select the lottery vending machine to perform one of the following outputs from the output slot means: the lottery vending machine outputs cash having an amount equal to the money prize amount associated with the winning lottery ticket wherein the money fund source provides the cash, outputs another lottery ticket having a value equal to the money prize amount, outputs a first plurality of lottery tickets having a sum value equal to the money prize amount, outputs a second plurality of lottery tickets directed to different types of lottery contests and having the sum value equal to the money prize amount, or outputs a combination of cash and at least one additional lottery ticket wherein the combination has the sum value equal to the money prize amount; wherein each one of the lottery tickets that is output by the lottery vending machine includes a respective code and is directed to a corresponding lottery contest;
wherein the screen displays a zero dollar amount and the output slot means does not output any cash if the winning lottery ticket does not include the winning number set; wherein the cash provided by the money fund source comprises at least one dollar bill; wherein the particular type of lottery contest and corresponding lottery contest are managed by a state lottery authority and wherein the lottery vending machine is configured to elect the winning lottery ticket and is configured to not output any prizes, if the money prize amount of the winning lottery ticket with the winning number set exceeds a state limit.

9. The apparatus of claim 8, wherein the lottery vending machine is configured to display the money prize amount if the winning lottery ticket has the winning number set.

10. The apparatus of claim 8, wherein the lottery vending machine is configured to determine if a money prize amount of the winning lottery ticket with the winning number set exceeds a state limit.

11. The apparatus of claim 8, wherein the lottery vending machine is configured to display a text message and is configured to not output any prizes, if the money prize amount of the winning lottery ticket with the winning number set exceeds a state limit.

12. A method of processing a transaction in a lottery vending machine, the method comprising:

inserting a winning lottery ticket into a lottery vending machine;

wherein the winning lottery ticket is directed to a particular type of lottery contest; wherein the lottery vending machine is configured to receive the winning lottery ticket in a ticket insert in the lottery vending machine;

wherein the lottery vending machine is configured to receive cash in a cash insert in the lottery vending machine and is configured to output a second lottery ticket on an output slot in the lottery vending machine based on the cash received in the cash insert and on a lottery contest selected in a user interface block on the lottery vending machine;

scanning the winning lottery ticket wherein the winning lottery ticket comprises a code; if the winning lottery ticket comprises a winning number set, then determining if a money prize exceeds a state limit;

wherein the lottery vending machine comprises a scanner configured for scanning the code and a processor configured for determining if the winning lottery ticket includes the winning number set in the particular type of lottery contest;

wherein the lottery vending machine comprises a money fund source in the lottery vending machine, wherein the money fund source provides a money prize comprising cash that is outputted on the output slot in the lottery vending machine;

wherein the lottery vending machine comprises a screen configured for displaying a money prize amount associated with the winning lottery ticket; and if the money prize does not exceed the state limit, then inputting by an individual, into the user interface block, an input so that the input permits the individual to select the lottery vending machine to perform one of the following outputs from the output slot: the lottery vending machine outputs cash equal to the money prize amount associated with the winning lottery ticket wherein the money fund source provides the cash, outputs another lottery ticket having a value equal to the money prize amount, outputs a plurality of lottery tickets having a sum value equal to the money prize amount, outputs a plurality of lottery tickets directed to different types of lottery contests and having the sum value equal to the money prize amount, or outputs a combination of cash and at least one additional lottery ticket wherein the combination has the sum value equal to the money prize amount;

wherein each one of the lottery tickets that is output by the lottery vending machine includes a respective code and is directed to a corresponding lottery contest; wherein the screen displays a zero dollar amount and the output slot does not output any cash if the winning lottery ticket does not include the winning number set; wherein the cash from the money fund source comprises at least one dollar bill, wherein the particular type of lottery contest and corresponding lottery contest are managed by a state lottery authority and wherein if the money prize exceeds the state limit, then displaying a text indicating that the money prize exceeds the state limit and electing the winning lottery ticket and preventing an output of any prizes from the lottery vending machine; wherein the cash from the money fund source comprises at least one dollar bill; wherein the particular type of lottery contest and correspond lottery contest are managed by a state lottery authority.

\* \* \* \* \*